US011193466B2

(12) United States Patent
Tamane et al.

(10) Patent No.: US 11,193,466 B2
(45) Date of Patent: Dec. 7, 2021

(54) REMOTE STARTUP SYSTEM, TERMINAL, VEHICLE, AND REMOTE STARTUP METHOD

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 608 days.

(21) Appl. No.: 15/990,080

(22) Filed: May 25, 2018

(65) Prior Publication Data

US 2018/0347531 A1 Dec. 6, 2018

(30) Foreign Application Priority Data

May 31, 2017 (JP) .............................. JP2017-108784

(51) Int. Cl.
*F02N 11/08* (2006.01)
*H04W 76/19* (2018.01)
*H04W 76/14* (2018.01)

(52) U.S. Cl.
CPC ......... *F02N 11/0807* (2013.01); *H04W 76/14* (2018.02); *H04W 76/19* (2018.02); *F02N 2200/0806* (2013.01); *F02N 2300/306* (2013.01)

(58) Field of Classification Search
CPC .. F02N 11/08; F02N 11/12; F02N 2200/0806; F02N 2300/306; H04W 76/19; H04W 76/14
See application file for complete search history.

(56) References Cited

U.S. PATENT DOCUMENTS

| 8,841,987 B1* | 9/2014 | Stanfield | G07C 9/00896 340/5.61 |
| 9,581,453 B2* | 2/2017 | Lacher | G01S 19/13 |
| 2011/0112969 A1* | 5/2011 | Zaid | G07C 9/00571 705/50 |

(Continued)

FOREIGN PATENT DOCUMENTS

JP 2013238184 A 11/2013

*Primary Examiner* — Khoi H Tran
*Assistant Examiner* — Nhi Q Bui
(74) *Attorney, Agent, or Firm* — Hunton Andrews Kurth LLP

(57) ABSTRACT

A remote startup system includes a terminal; a center server configured to communicate with the terminal and receive a startup request from the terminal; and a vehicle on which a driving device is mounted, the vehicle being configured to communicate with the center server, receive the startup request from the center server, and start up the driving device, wherein at least one of the center server, the terminal, and the vehicle includes a direct communication permission unit configured to permit direct communication in a case where the communication between the terminal and the center server or between the center server and the vehicle is disrupted, the direct communication being transmission or reception of information on the startup of the driving device based on the startup request, the direct communication being performed between the terminal and the vehicle directly without passing through the center server.

8 Claims, 7 Drawing Sheets

(56) References Cited

U.S. PATENT DOCUMENTS

2012/0127906 A1* 5/2012 Evans ................... H04W 12/08
                                                        370/312
2013/0151036 A1* 6/2013 Harumoto .......... G07C 9/00309
                                                         701/2
2013/0268139 A1* 10/2013 Endo ................... F02N 11/0807
                                                         701/2

* cited by examiner

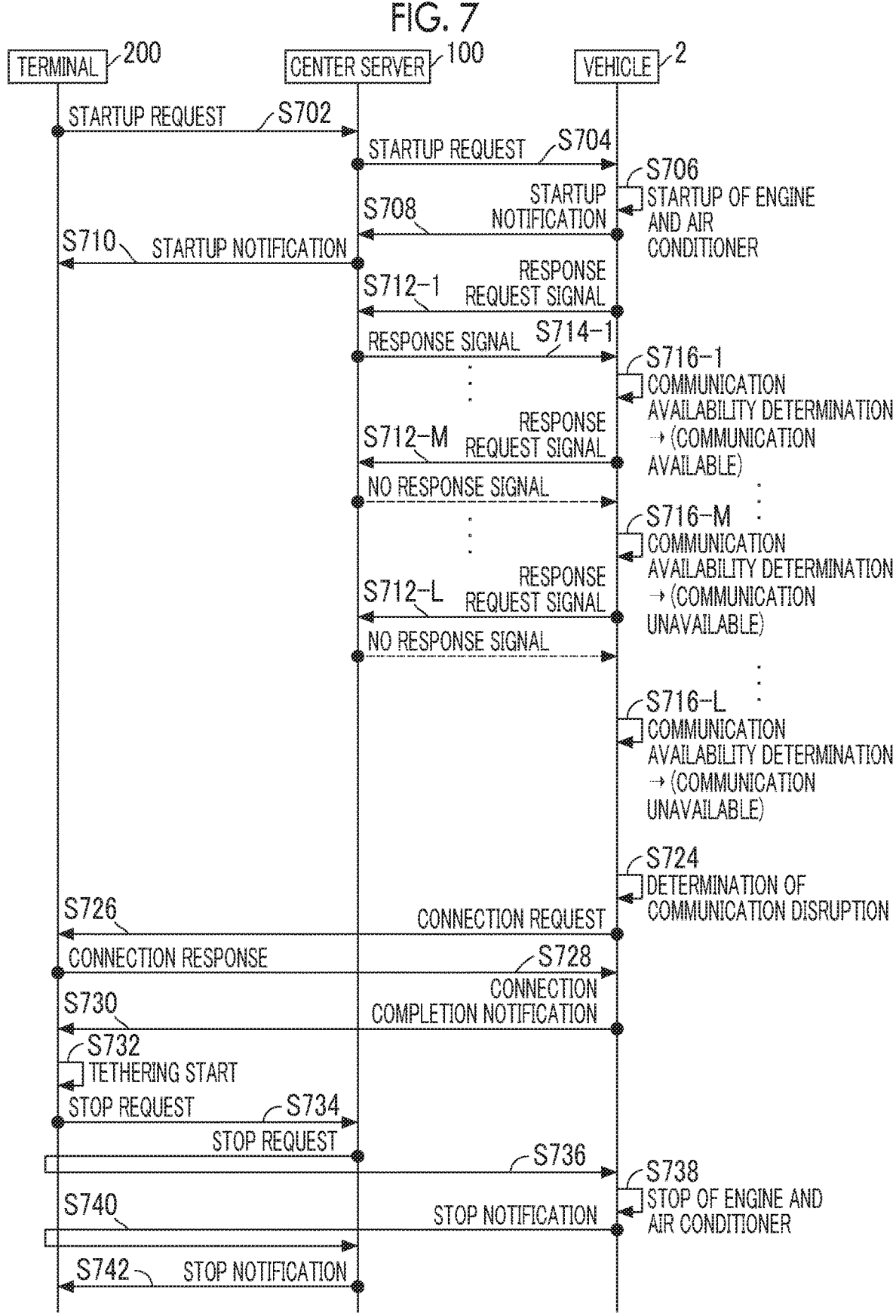

REMOTE STARTUP SYSTEM, TERMINAL, VEHICLE, AND REMOTE STARTUP METHOD

INCORPORATION BY REFERENCE

The disclosure of Japanese Patent Application No. 2017-108784 filed on May 31, 2017 including the specification, drawings and abstract is incorporated herein by reference in its entirety.

BACKGROUND

1. Technical Field

The present disclosure relates to a remote startup system for an engine of a vehicle, a terminal, a vehicle, and a remote startup method.

2. Description of Related Art

A center type remote startup system that starts up a driving device such as an engine or an electric compressor (an electric motor) for air conditioning mounted on a vehicle in response to a startup request transmitted from a portable communication terminal device carried by a user to a vehicle remotely located via a center server has been known (see, for example, Japanese Unexamined Patent Application Publication No. 2013-238184 (JP 2013-238184 A)).

SUMMARY

However, in the center type remote startup system, when communication is disrupted between a terminal and a center server or between the center server and the vehicle, a user is likely to be unable to perform a remote operation of the vehicle through the center server.

The present disclosure provides a center type remote startup system, a terminal, a vehicle, and a remote startup method capable of performing an operation regarding startup of a driving device based on a startup request from the terminal using replacement means even in a case where communication disruption occurs and an operation of the vehicle cannot be performed from the terminal via a center server.

A first aspect of the present disclosure relates to a remote startup system including: a communication terminal; a center server configured to communicate with the terminal and receive a startup request from the terminal; and a vehicle on which a driving device is mounted, the vehicle being configured to communicate with the center server, receive the startup request of the driving device from the center server, and start up the driving device. At least one of the center server, the terminal, and the vehicle includes a direct communication permission unit configured to permit direct communication in a case where the communication between the terminal and the center server or between the center server and the vehicle is disrupted, the direct communication being transmission or reception of information on the startup of the driving device based on the startup request, the direct communication being performed between the terminal and the vehicle directly without passing through the center server.

According to the first aspect of the present disclosure, in a case where the communication between the terminal and the center server or between the center server and the vehicle is disrupted, direct communication between the terminal and the vehicle without passing through the center server is permitted. Thus, even in a case where the communication disruption occurs and an operation of the vehicle cannot be performed from the terminal through the center server, a user can perform an operation regarding the startup of the driving device of the vehicle from the terminal through the direct communication.

In the remote startup system of the first aspect of the present disclosure, the terminal may include a terminal communication device that communicates with the vehicle, and the vehicle may include a vehicle communication device that communicates with the terminal. The direct communication permission unit may be configured to permit the direct communication using the terminal communication device and the vehicle communication device.

According to the first aspect of the present disclosure, it is possible to realize direct communication between the terminal and the vehicle using communication devices for direct communication respectively provided in the terminal and the vehicle, for example, communication devices based on a communication standard such as Bluetooth or Wi-Fi (both registered trademark), as described above.

In the remote startup system of the first aspect of the present disclosure, at least one of the terminal and the vehicle may include a request transmission unit configured to transmit a connection request signal for requesting establishment of communication between the vehicle and the terminal from one of the terminal and the vehicle in which the request transmission unit is included to the other using the terminal communication device or the vehicle communication device. The direct communication permission unit may be provided in the one of the terminal and the vehicle in which the request transmission unit is provided, and be configured to permit the direct communication in a case where communication with the center server is disrupted. The request transmission unit may be configured to transmit the connection request signal in a case where the direct communication is permitted by the direct communication permission unit.

According to the first aspect of the present disclosure, when the direct communication between the vehicle and the terminal is permitted in any one of the vehicle and the terminal, the connection request signal is transmitted to the other using the communication device for direct communication provided in the one of the vehicle and the terminal, such that the direct connection between the vehicle and the terminal can be established.

In the remote startup system of the first aspect of the present disclosure, the terminal or the vehicle receiving the connection request signal may include a communication establishment unit configured to establish communication between the terminal and the vehicle using the terminal communication device and the vehicle communication device when the connection request signal is received; and a notification transmission unit configured to transmit a notification regarding the information transmitted or received between the terminal and the vehicle to the center server in a case where the communication between the terminal and the vehicle is established by the communication establishment unit.

According to the first aspect of the present disclosure, when the direct communication between the terminal and the vehicle is established, information transmitted or received between the terminal and the vehicle is transmitted from a side receiving the connection request signal, that is, the one of the terminal and the vehicle of which communication with the center server is likely to occur, to the center server. Thus, even when the communication between the terminal and the center server or between the center server and the vehicle is disrupted and exchange through the direct communication between the vehicle and the terminal is started, a situation of the direct communication can be recognized on the center server side.

In the remote startup system of the first aspect of the present disclosure, any one of the terminal and the vehicle may include a tethering unit configured to communicably connect the other of the terminal and the vehicle that is a transmission source of the connection request signal to the center server through tethering when the connection request signal is received.

According to the first aspect of the present disclosure, even when the communication between the terminal and the center server or between the center server and the vehicle is disrupted, the transmission or reception of information between the terminal and the vehicle can be performed through the center server by using tethering communication. Thus, even when the communication between the terminal and the center server or between the center server and the vehicle is disrupted and the exchange through the direct communication between the vehicle and the terminal is started, a situation of the direct communication can be recognized on the center server side.

In the remote startup system of the first aspect of the present disclosure, at least one of the terminal and the vehicle may include a communication availability determination unit configured to determine whether or not communication between the terminal or the vehicle and the center server is available. The communication availability determination unit may be provided on the one of the terminal and the vehicle in which the direct communication permission unit is provided, and be configured to periodically transmit a response request signal to the center server and determine whether or not the communication between the one and the center server is available based on a presence or absence of a reply from the center server in response to the response request signal.

According to the first aspect of the present disclosure, specifically, it is possible to determine whether or not the communication between the terminal and the center server or between the center server and the vehicle is available by periodically transmitting the response request signal for requesting a reply from the terminal or the vehicle to the center server.

In the remote startup system of the first aspect of the present disclosure, the direct communication permission unit may be configured to determine whether or not to permit the direct communication based on a result of the determination of the communication availability determination unit as to whether or not the communication between the terminal or the vehicle and the center server is available.

According to the first aspect of the present disclosure, when the determination is made that the communication is unavailable based on the determination as to whether or not the communication is available through the periodic transmission of the response request signal, the determination is made that the communication is disrupted, and direct communication can be permitted.

In the remote startup system of the first aspect of the present disclosure, the direct communication permission unit may be configured to permit the direct communication in a case where a determination is made, based on a determination result of the communication availability determination unit, that communication between the one of the terminal and the vehicle and the center server is disrupted and an elapsed time of the communication disruption exceeds a predetermined threshold value, the one of the terminal and the vehicle including the direct communication permission unit.

According to the first aspect of the present disclosure, since the direct communication between the terminal and the vehicle is permitted after a certain time has elapsed from the communication disruption, a situation in which exceptional direct communication is permitted can be avoided, for example, in a case where the communication is temporarily disrupted and immediately restored.

A second aspect of the present disclosure relates to a terminal configured to start up a driving device via a center server configured to communicate with a vehicle and transmit a transmission signal for starting up the driving device mounted on the vehicle to the vehicle, by communicating with the center server and transmitting a startup request to the center server. The terminal includes a direct communication permission unit configured to permit direct communication in a case where the communication with the center server is disrupted, the direct communication being transmission or reception of information on the startup of the driving device based on the startup request, the direct communication being performed between the terminal and the vehicle directly without passing through the center server.

A third aspect of the present disclosure relates to a vehicle configured to communicate with a center server communicating with a terminal and start up a driving device mounted on the vehicle in response to a predetermined transmission signal from the center server based on a startup request transmitted from the terminal to the center server. The vehicle includes a direct communication permission unit configured to permit direct communication in a case where the communication with the center server is disrupted, the direct communication being transmission or reception of information on the startup of the driving device based on the startup request, the direct communication being performed between the terminal and the vehicle directly without passing through the center server.

A fourth aspect of the present disclosure relates to a remote startup method that is executed by a remote startup system including a terminal, a center server communicating with the terminal, and a vehicle that is communicable with the center server, and configured to start up a driving device mounted on the vehicle based on a startup request transmitted from the terminal to the center server. The remote startup method includes permitting direct communication in a case where the communication between the terminal and the center server or between the center server and the vehicle is disrupted, the direct communication being transmission or reception of information on the startup of the driving device based on the startup request, the direct communication being performed between the terminal and the vehicle directly without passing through the center server.

According to the aspects of the present disclosure, it is possible to provide a center type remote startup system, a terminal, a vehicle, and a remote startup method capable of performing an operation regarding startup of a driving device based on a startup request from the terminal using replacement means even in a case where communication disruption occurs and an operation of the vehicle cannot be performed from the terminal via a center server.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a sequence diagram illustrating an example of an operation of the remote startup system according to the second embodiment.

DETAILED DESCRIPTION OF EMBODIMENTS

Hereinafter, modes for carrying out the disclosure will be described with reference to the drawings.

First Embodiment

Configuration of Remote Startup System

First, a configuration of a remote startup system 1 according to the first embodiment will be described with reference to FIGS. 1 to 4.

Figure 1:
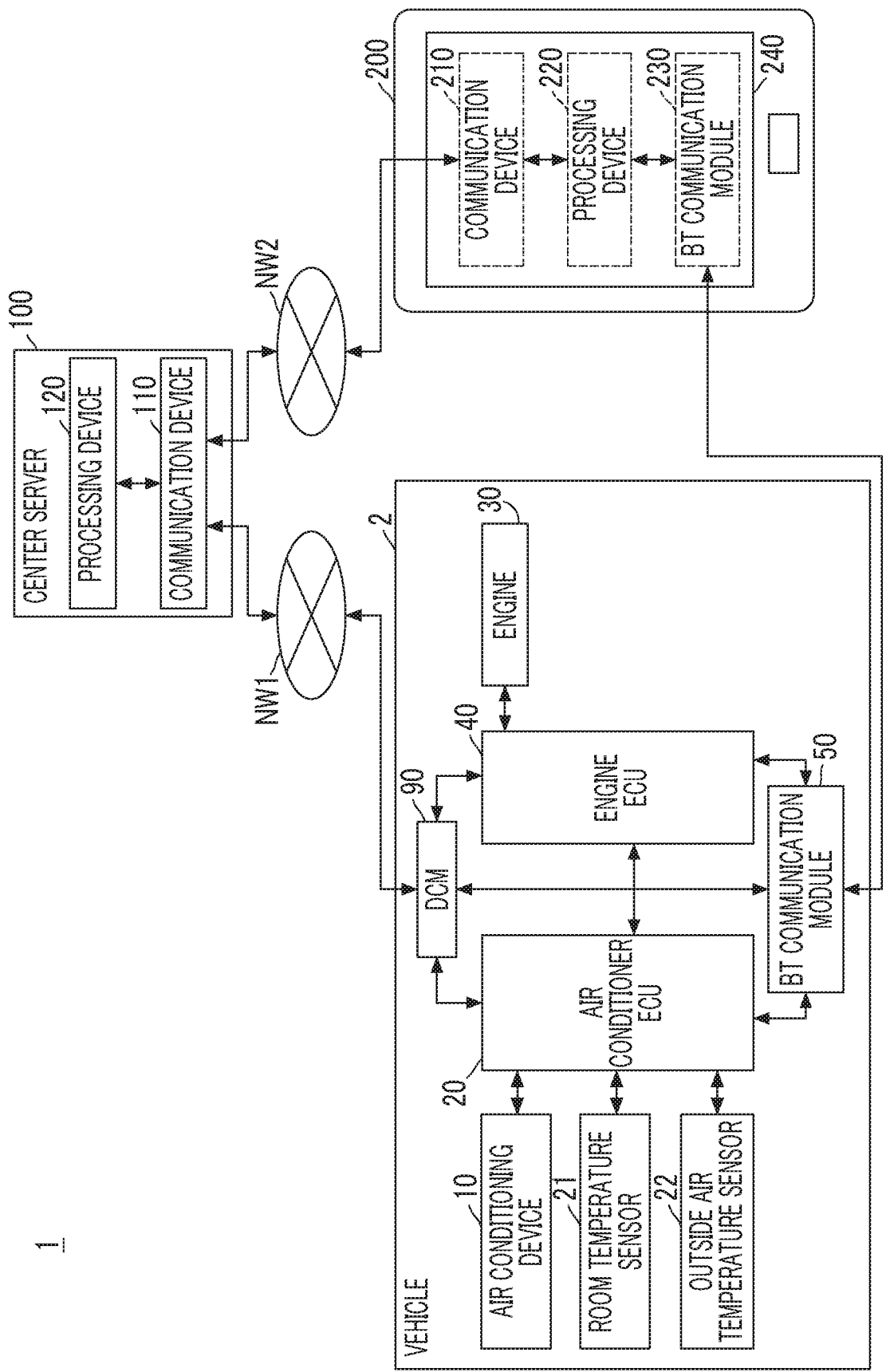
FIG. 1 is a configuration diagram illustrating an example of a configuration of a remote startup system according to a first embodiment.
Figure 2:
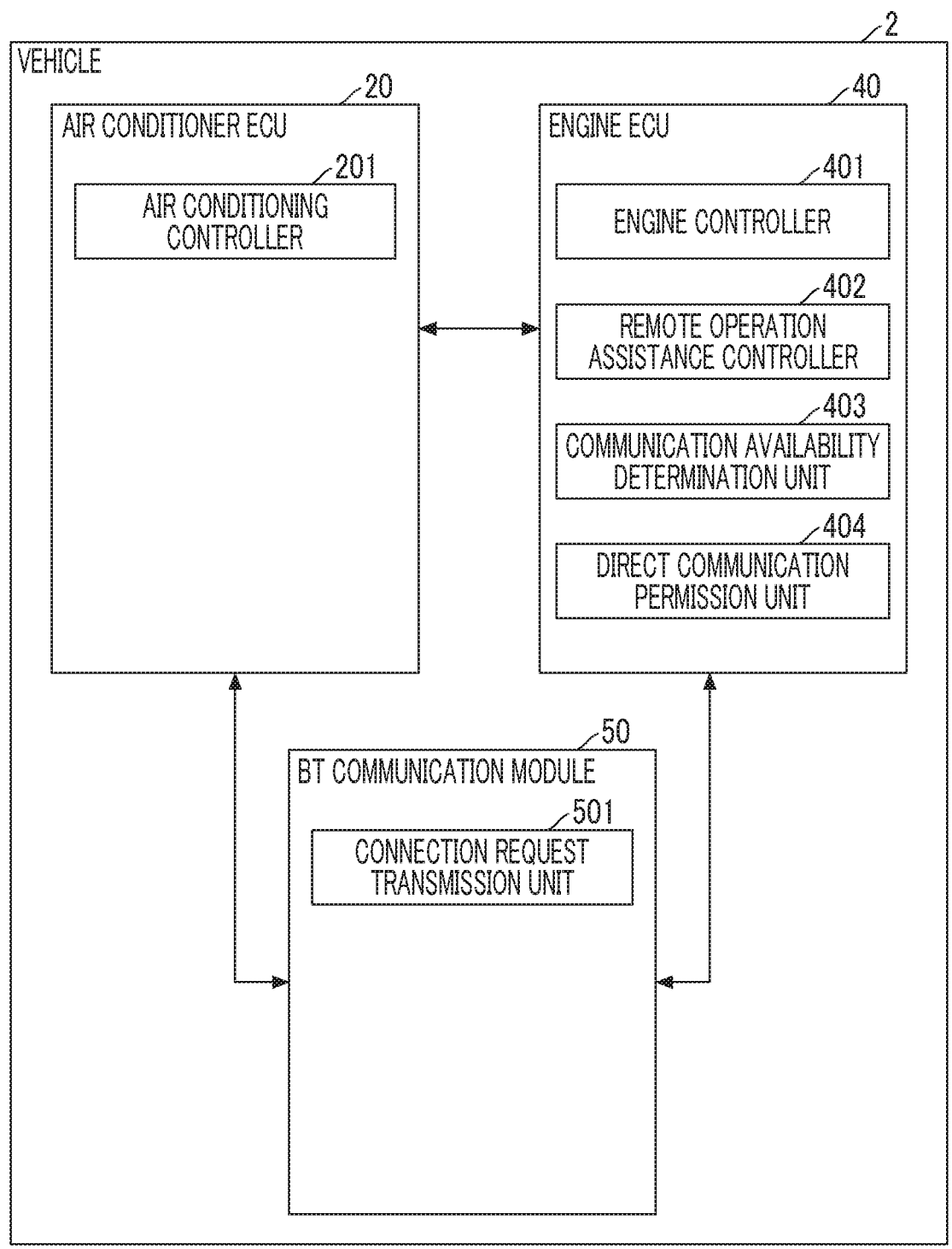
FIG. 2 is a functional block diagram illustrating an example of a functional configuration of a vehicle (an air conditioner ECU, an engine ECU, and a BT communication module)
Figure 3:
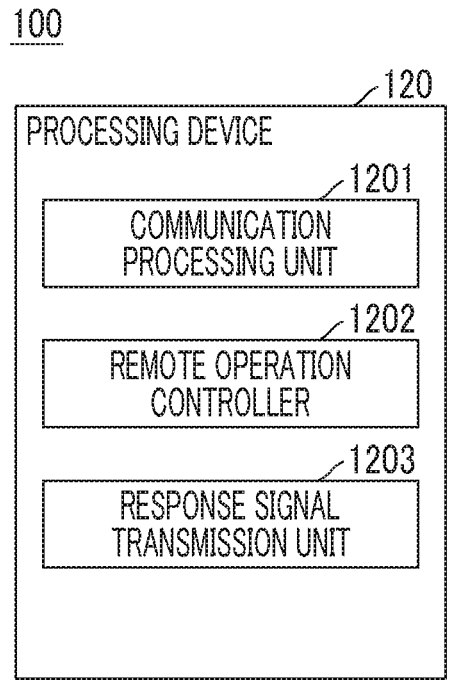
FIG. 3 is a functional block diagram illustrating an example of a functional configuration of a center server (a processing device)
Figure 4:
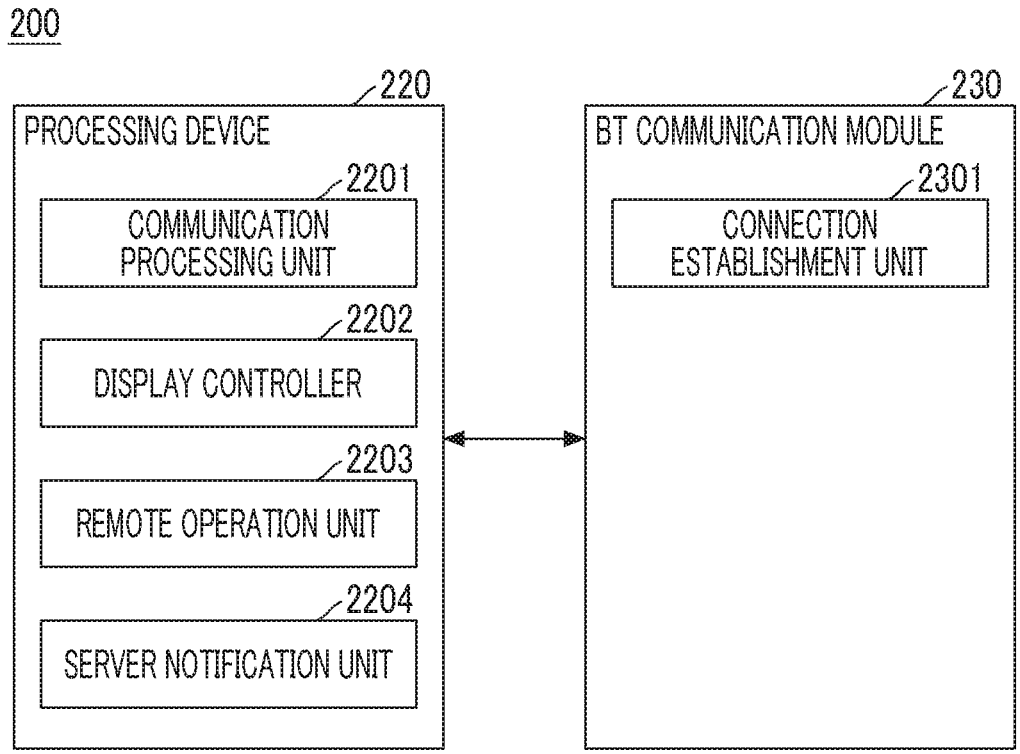
FIG. 4 is a functional block diagram illustrating an example of a functional configuration of a terminal (a processing device and a BT communication module)

FIG. 1 is a configuration diagram illustrating an example of a configuration of the remote startup system 1 according to the first embodiment. FIG. 2 is a functional block diagram illustrating an example of a functional configuration of a vehicle 2 according to the first embodiment. FIG. 3 is a functional block diagram illustrating an example of a functional configuration of a center server 100 according to the first embodiment. FIG. 4 is a functional block diagram illustrating an example of a functional configuration of a terminal 200 according to the first embodiment.

The remote startup system 1 includes the vehicle 2, the center server 100, and the terminal 200 carried by a user, and starts up an engine 30 and an air conditioning device 10 of the vehicle 2 to be described below according to a startup request that is transmitted from the terminal 200 to the center server 100.

The vehicle 2 includes an air conditioning device 10, the air conditioner electronic control unit (ECU) 20, a room temperature sensor 21, an outside air temperature sensor 22, the engine 30, the engine ECU 40, a Bluetooth communication module (hereinafter referred to as a BT communication module) 50, and a data communication module (DCM) 90.

The air conditioning device 10 adjusts, for example, a temperature in the cabin of the vehicle 2. The air conditioning device 10 includes, for example, a refrigeration cycle including an evaporator (not illustrated) and a compressor (not illustrated) that is driven by the engine 30, and a heater (not illustrated) using coolant of the engine 30 as a heat source. Under the control of the air conditioner ECU 20 (the air conditioning controller 201 to be described below), the air conditioning device 10 adjusts the temperature of air sent out from an air outlet by appropriately setting a ratio of air cooled by passing through the evaporator (cold air) to air warmed using the coolant of the engine 30 as a heat source (hot air) in a changeable manner. Further, the air conditioning device 10 has a defroster mode, and removes frost that is generated on the outside of a windshield of the vehicle 2 or fog generated on the cabin-side of the windshield of the vehicle 2 by sending air having a relatively low humidity and a relatively high temperature along the windshield of the vehicle 2 from the air outlet corresponding to the defroster mode.

The room temperature sensor 21 is provided in the cabin of the vehicle 2, such as the inside of an instrument panel (not illustrated), and detects a temperature in the cabin of the vehicle 2 (room temperature). The room temperature sensor 21 is communicably connected to the air conditioner ECU 20 via a one-to-one communication line or the like. A detection signal corresponding to the room temperature of the vehicle 2 detected by the room temperature sensor 21 is input to the air conditioner ECU 20.

The outside air temperature sensor 22 is provided on an outside of the vehicle 2 such as a front end portion of an engine compartment provided in a front portion of the vehicle 2 (a portion into which outside air is introduced), that is, on the back side of a front grille of the vehicle 2, and detects a temperature of the outside (outside air temperature) of the vehicle 2. The outside air temperature sensor 22 is communicably connected to the air conditioner ECU 20 via a one-to-one communication line or the like, and a detection signal corresponding to the detected outdoor air temperature is input to the air conditioner ECU 20.

The air conditioner ECU 20 is an electronic control unit that performs various controls regarding the air conditioning device 10. The function of the air conditioner ECU 20 may be realized by hardware, software, or a combination thereof. The air conditioner ECU 20 may be mainly configured of, for example, a microcomputer including a central processing unit (CPU), a random access memory (RAM), a read only memory (ROM), an auxiliary storage device, an input-output interface (I/O), and the like. Hereinafter, the same applies to the engine ECU 40. The air conditioner ECU 20 includes, for example, an air conditioning controller 201 as a functional unit that is realized by executing one or more programs stored in a ROM, an auxiliary storage device, or the like on the CPU.

The air conditioning controller 201 controls an operation of the air conditioning device 10 according to a set state of a set temperature, a mode (a plurality of air outlet modes according to a combination of the air outlets or defroster mode), and the like. Specifically, the air conditioning controller 201 controls the operation of the air conditioning device 10, for example, so that the room temperature of the vehicle 2 becomes the set temperature, based on a detected value of the room temperature sensor 21, the outside air temperature sensor 22, and the like. Further, the air conditioning controller 201 starts up the air conditioning device 10 in response to an air conditioning startup request from a remote operation assistance controller 402 to be described below and controls the operation of the air conditioning device 10 according to setting content included in the air conditioning startup request.

Various ECUs including the air conditioner ECU 20 and the engine ECU 40, the BT communication module 50 and the DCM 90 are communicably connected to each other over an in-vehicle network based on a communication protocol of a controller area network (CAN) or the like.

The engine 30 (an example of a driving device) is a driving force source of the vehicle 2, and is a driving force source of the air conditioning device 10, specifically, the compressor in the refrigeration cycle of the air conditioning device 10. The engine 30 is operated by burning gasoline, light oil, or the like supplied from a fuel tank (not illustrated) via a fuel pump (not illustrated) in a cylinder under the control of the engine ECU 40. The engine 30, specifically, various actuators (a fuel injection device that injects fuel, an ignition device that ignites gasoline injected into the cylinder, an electric motor for changing an opening and closing timing of an intake or exhaust valve, or the like) assembled in the engine 30 are communicably connected to the engine ECU 40 via a one-to-one communication line or the like, and are operated according to a control command transmitted from the engine ECU 40.

The engine ECU 40 is an electronic control unit that performs various control processes of the engine 30 including a starter (not illustrated). The engine ECU 40 includes, for example, an engine controller 401, a remote operation assistance controller 402, a communication availability determination unit 403, and a direct communication permission unit 404, as functional units that are realized by executing one or more programs stored in a ROM, an auxiliary storage device, or the like.

The engine controller 401 performs operation control of the engine 30 according to an operation state by a driver of the vehicle 2 (for example, an accelerator operation amount or a selected gear shift stage of a transmission (not illustrated)), an environmental state of the periphery of the vehicle 2 (for example, an outside air temperature), or the like. For example, when an ignition switch (IG switch) is turned ON (IG-ON) or when an engine startup request is input from the outside, the engine controller 401 starts up the engine 30. Specifically, the engine controller 401 switches a relay (not illustrated) for energizing a starter to a connected state to drive the starter, and appropriately controls a fuel injection device and an ignition device according to cranking by the starter to start up the engine 30.

In response to a startup request that is received from the terminal 200 through the center server 100, the remote operation assistance controller 402 transmits an engine startup request and an air conditioning startup request to the engine controller 401 and the air conditioning controller 201, respectively, to start up the air conditioning device 10 and the engine 30. Further, when a predetermined end condition is satisfied after the air conditioning device 10 and the engine 30 are started up, the remote operation assistance controller 402 transmits an engine stop request and an air conditioning stop request to the engine controller 401 and the air conditioning controller 201, respectively, to stop the air conditioning device 10 and the engine 30. Further, for example, when a set operation time included in the startup request or defined in advance has elapsed from the startup of the air conditioning device 10 and the engine 30 as an end condition, the remote operation assistance controller 402 may stop the air conditioning device 10 and the engine 30. Further, for example, when the room temperature of the vehicle 2 has been determined to have reached a set temperature included in the startup request or defined in advance after the startup of the air conditioning device 10 and the engine 30 as an end condition, the remote operation assistance controller 402 may stop the air conditioning device 10 and the engine 30. For example, when a signal indicating that an operation for stopping the air conditioning device 10 and the engine 30 is executed has been received from the terminal 200 through the center server 100 by the DCM 90 as an end condition, the remote operation assistance controller 402 may stop the air conditioning device 10 and the engine 30.

When the direct communication with the terminal 200 using the BT communication module 50 is permitted by the direct communication permission unit 404 to be described below, the remote operation assistance controller 402 performs exchange of information with the terminal 200 via the BT communication module 50 to perform control related to the startup of the engine 30 based on the startup request from the terminal 200. Details thereof will be described below.

The function of the remote operation assistance controller 402 may be provided in the air conditioner ECU 20 or may be provided in another ECU that can communicate with the air conditioner ECU 20 and the engine ECU 40 over an in-vehicle network based on a communication protocol such as a CAN.

The communication availability determination unit 403 determines whether or not the communication between the vehicle 2 and the center server 100 via the DCM 90 is available. For example, the communication availability determination unit 403 transmits a response request signal to the center server 100 via the DCM 90, and determines whether or not the communication with the center server 100 is available according to whether or not a response signal from the center server 100 is received by the DCM 90 in response to the response request signal.

The function of the communication availability determination unit 403 may be provided in the air conditioner ECU 20 or may be provided in another ECU that can communicate with the air conditioner ECU 20 and the engine ECU 40 over an in-vehicle network based on a communication protocol such as a CAN.

The direct communication permission unit 404 determines a communication state between the vehicle 2 and the center server 100 based on a determination result of the communication availability determination unit 403. When a determination is made that the communication between the vehicle 2 and the center server 100 has been disrupted, the direct communication permission unit 404 exceptionally permits direct communication to directly perform transmission or reception of information related to the startup of the engine 30 based on the startup request from the terminal 200 without passing through the center server 100 between the vehicle 2 and the terminal 200 using the BT communication module 50 mounted on the vehicle 2 and the BT communication module 230 (to be described below) mounted on the terminal 200. The direct communication permission unit 404 manages, for example, a direct communication permission flag (hereinafter simply referred to as a flag), and changes the flag from OFF to ON when the direct communication is permitted. Accordingly, the remote operation assistance controller 402 can determine whether or not the direct communication is permitted by confirming an ON or OFF state of the flag.

The function of the direct communication permission unit 404 may be provided in the air conditioner ECU 20 or may be provided in other ECUs that can communicate with the air conditioner ECU 20 and the engine ECU 40 over an in-vehicle network based on a communication protocol such as a CAN.

The BT communication module 50 (an example of a vehicle communication device) is a communication device conforming to a Bluetooth communication standard. The BT communication module 50 is bidirectionally communicably connected to the BT communication module 230 of the terminal 200 through a pairing process with the BT communication module 230 of the terminal 200 to be described below. The BT communication module 50 includes a connection request transmission unit 501 as a functional unit that is realized by, for example, an integrated circuit (IC) chip.

When direct communication is permitted by the direct communication permission unit 404, the connection request transmission unit 501 (an example of a request transmission unit) transmits a connection request signal to the periphery of the vehicle 2 via the BT communication module 50. Accordingly, the BT communication module 230 (specifically, a connection establishment unit 2301 to be described below) of the terminal 200 can receive the connection request signal, and establish a communicable connection state (a pairing state) in response to the connection request.

The BT communication module 50 is an example of a communication device that performs near field communication, and any device may be adopted as long as an aspect in which the device can be directly communicably connected to the terminal 200 is adopted. For example, the BT communication module 50 may be replaced with a Wi-Fi communication module, a Bluetooth Low Energy (BLE) communication module, or the like.

The DCM 90 is, for example, a communication device that bidirectionally communicates with the center server 100 over a predetermined communication network NW1 including a mobile phone network including a plurality of base stations as ends, an Internet network, or the like (hereinafter, the sample applies to a communication network NW2). As described above, the DCM 90 is mutually communicably connected to various ECUs such as the air conditioner ECU 20 and the engine ECU 40, the BT communication module 50, or the like over an in-vehicle network such as a CAN.

The center server 100 is interposed between the vehicle 2 and the terminal 200 carried by the user, and performs control regarding a remote operation of the vehicle 2 using the terminal 200 by the user, specifically, control regarding the startup of the engine 30 of the vehicle 2 based on a remote operation from the terminal 200. The center server 100 includes a communication device 110 and a processing device 120.

The communication device 110 is a device that bidirectionally communicates with the vehicle 2 (specifically, the DCM 90) and the terminal 200 over the communication networks NW1 and NW2 under the control of the processing device 120 (specifically, the communication processing unit 1201).

The processing device 120 executes various control processes in the center server 100. The function of the processing device 120 may be realized by hardware, software, or a combination thereof. The processing device 120 may be mainly configured of, for example, one or a plurality of server computers each including a CPU, a RAM, a ROM, an auxiliary storage device, an I/O interface, and the like. The processing device 120 includes, for example, a communication processing unit 1201, a remote operation controller 1202, and a response signal transmission unit 1203, as functional units that are realized by executing one or more programs stored in the ROM or the auxiliary storage device on the CPU.

The communication processing unit 1201 controls the communication device 110 to transmit and receive various signals (control signals, information signals, or the like) to and from the vehicle 2 and the terminal 200.

The remote operation controller 1202 performs control regarding the startup of the engine 30 based on the startup request received from the terminal 200 by the communication processing unit 1201. For example, when the startup request from the terminal 200 is received by the communication processing unit 1201, the remote operation controller 1202 transmits the startup request to the vehicle 2 via the communication processing unit 1201 and starts up the engine 30 and the air conditioning device 10.

In a case where the response request signal from the vehicle 2 is received by the communication processing unit 1201, the response signal transmission unit 1203 transmits a predetermined response signal to the vehicle 2 via the communication processing unit 1201.

The terminal 200, for example, transmits the startup request for the engine 30 in response to a predetermined operation input from the user to perform a remote operation regarding the startup of the vehicle 2. Further, the terminal 200 is, for example, a mobile terminal such as a smartphone or a tablet terminal carried by a user of the vehicle 2. The terminal 200 may be a stationary terminal carried by the user of the vehicle 2, such as a desktop type computer terminal. The terminal 200 includes a communication device 210, a processing device 220, the BT communication module 230, and a touch panel display (hereinafter simply referred to as a "display") 240.

The communication device 210 is a device that performs bidirectional communication with the center server 100 over the communication network NW2 under the control of the processing device 220 (specifically, a communication processing unit 2201 to be described below) and is, for example, a Long Term Evolution (LTE) module.

The processing device 220 performs various control processes in the terminal 200. The processing device 220 may be mainly configured of, for example, a computer including a CPU, a RAM, a ROM, an auxiliary storage device, an I/O interface, and the like. The processing device 220 includes, for example, a communication processing unit 2201, a display controller 2202, a remote operation unit 2203, and a server notification unit 2204, as functional units that are realized by executing one or more programs stored in the ROM, the auxiliary storage device, or the like on the CPU.

The communication processing unit 2201 controls the communication device 210 and transmits and receives various signals to and from the center server 100.

The display controller 2202 displays various images on the display 240. For example, the display controller 2202 displays various graphical user interfaces (GUIs) as operation screens on the display 240.

The remote operation unit 2203 executes various processes regarding a remote operation of the engine 30 and the air conditioning device 10 in response to a predetermined operation of the user with respect to a predetermined GUI displayed on the display 240 by the display controller 2202. A function of the remote operation unit 2203 becomes available, for example, by activating a predetermined application program (hereinafter referred to as "remote operation application") installed in the terminal 200 (the processing device 220) in response to a predetermined operation of the user.

For example, the remote operation unit 2203 transmits various signals regarding the remote operation of the vehicle 2 including a startup request for requesting the startup of the engine 30 and the air conditioning device 10 to the center server 100 via the communication processing unit 2201 in response to a predetermined operation of the user with respect to various GUIs displayed on the display 240 due to the activation of the remote operation application. Accordingly, a startup request transmitted to the center server 100 is received by the center server 100, the startup request is transmitted to the vehicle 2 under control of the center server 100 (specifically, the remote operation controller 1202), and the engine 30 and the air conditioning device 10 are started up. Further, for example, the user can set various settings when operating the air conditioning device 10 on a predetermined GUI, and the remote operation unit 2203 transmits various signals such as a startup request including the various settings to the center server 100. Accordingly, in the vehicle 2, control of the air conditioning device 10 based on the setting content (for example, a set temperature as a requested value of the room temperature of the vehicle by the user, or a set operation time as a requested value of an operation time of the air conditioning device 10 by the user) is performed.

When the direct communication is performed between the BT communication module 230 and the BT communication module 50 of the vehicle 2, the server notification unit 2204 (an example of a notification transmission unit) transmits a notification regarding an operation related to the startup of the engine 30 based on the startup request performed in the terminal 200 and the vehicle 2 to the center server 100 via the communication processing unit 2201. Accordingly, even when exchange between the terminal 200 and the vehicle 2 is performed without passing through the center server 100, the center server 100 can recognize content of the operation performed in the vehicle 2 and the terminal 200 through the above notification.

The BT communication module 230 (an example of a terminal communication device) is a communication device conforming to the Bluetooth communication standard, similar to the BT communication module 50 mounted on the vehicle 2. The BT communication module 230 is bidirectionally communicably connected to the BT communication module 50 of the vehicle 2 through a pairing process with the BT communication module 50 of the vehicle 2. The BT communication module 230 includes a connection establishment unit 2301 as a functional unit that is realized by, for example, an IC chip.

When the connection establishment unit 2301 (an example of a communication establishment unit) receives the connection request signal that is transmitted from the BT communication module 50 to the periphery of the vehicle 2, the connection establishment unit 2301 performs a process of establishing communication (a pairing process) between the BT communication module 50 of the vehicle 2 and the BT communication module 230 of the terminal 200 based on various types of setting information. Various types of setting information (profile information) of the BT communication module 50 of the vehicle 2 is registered in the connection establishment unit 2301 in advance. Accordingly, the BT communication module 50 of the vehicle 2 and the BT communication module 230 of the terminal 200 enter a pairing state and can bidirectionally perform transmission and reception of various signals.

The BT communication module 230 is an example of a communication device that performs near field communication. In an aspect in which the BT communication module 230 can be directly communicably connected to the vehicle 2, any device may be adopted on the premise that the BT communication module 230 conforms to the same communication standard as the communication device mounted on the vehicle 2. For example, the BT communication module 230 may be replaced with a Wi-Fi communication module, a BLE communication module, or the like, as described above.

Detailed Operation of Remote Startup System

A specific operation of the remote startup system 1 according to the first embodiment will be described with reference to FIGS. 5A and 5B.

Figure 5A:
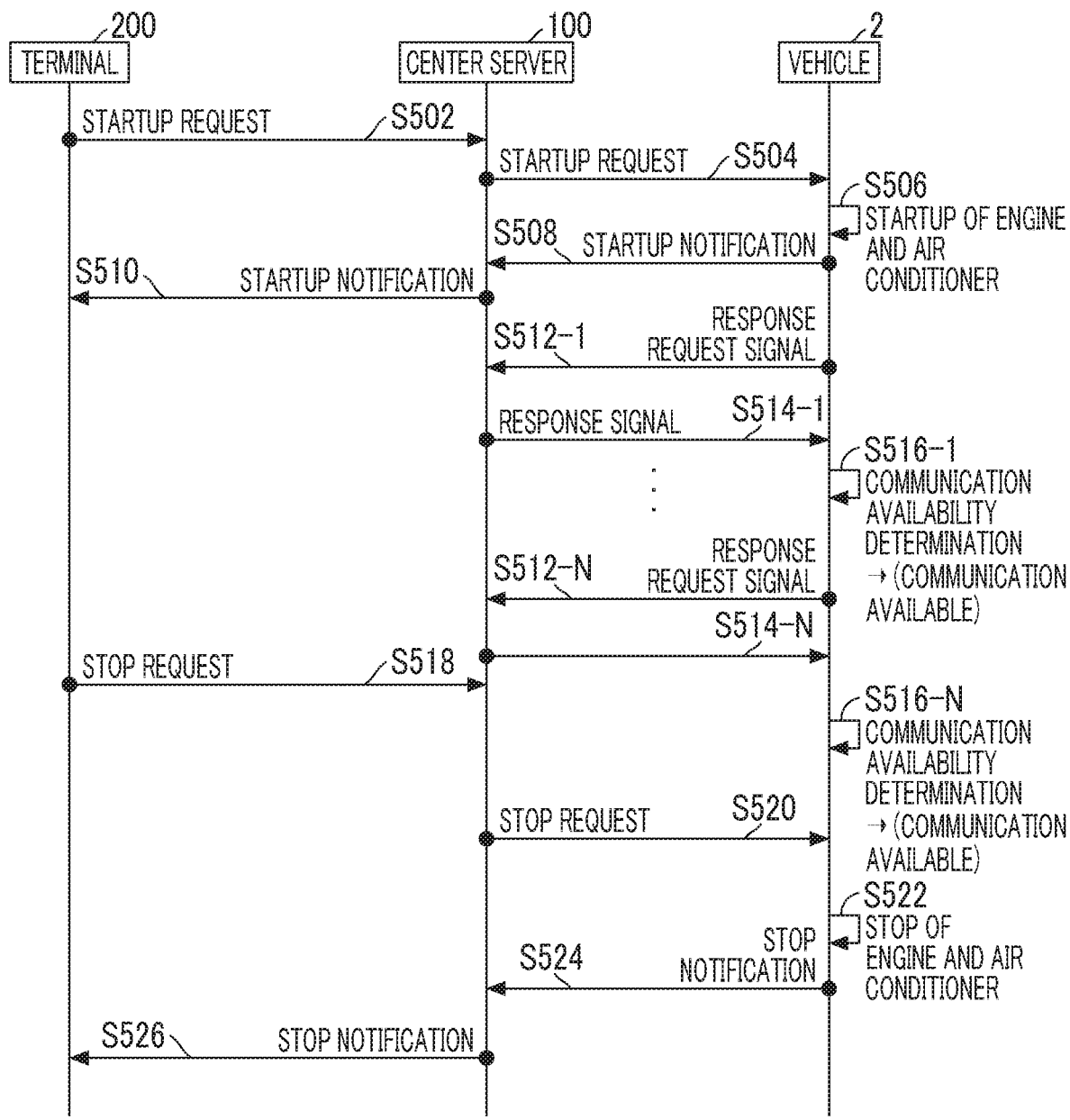
FIG. 5A is a sequence diagram illustrating an example of an operation of the remote startup system according to the first embodiment.
Figure 5B:
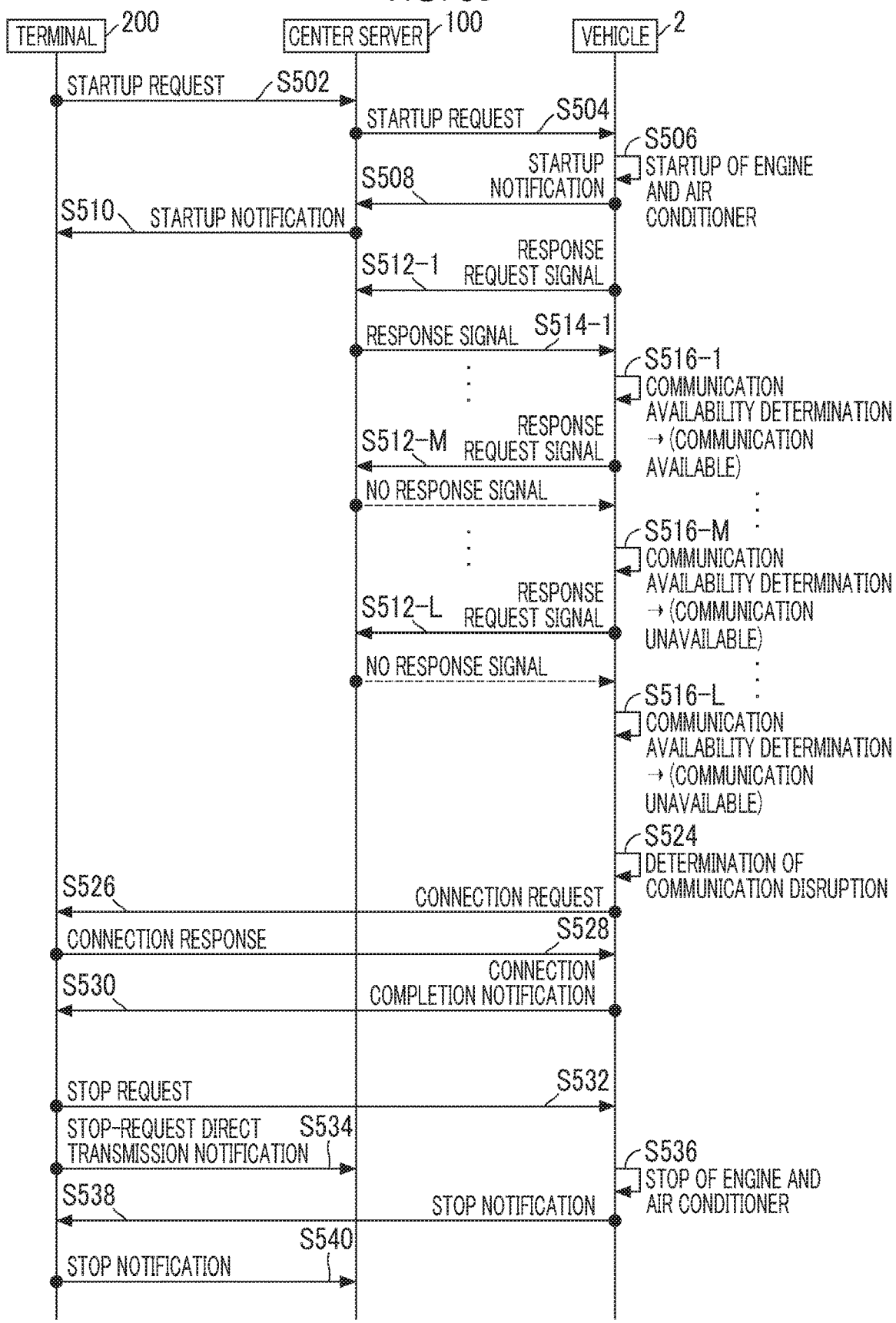
FIG. 5B is a sequence diagram illustrating another example of the operation of the remote startup system according to the first embodiment.

FIGS. 5A and 5B are sequence diagrams schematically illustrating an example and another example of the operation of the remote startup system 1 according to the first embodiment. Specifically, FIG. 5A is a diagram illustrating a specific example of the operation of the remote startup system 1 in a case where a communication state between the vehicle 2 and the center server 100 is normal. FIG. 5B is a diagram illustrating an example of the operation of the remote startup system 1 in a case where the communication between the vehicle 2 and the center server 100 is disrupted.

In FIGS. 5A and 5B, since steps S502 to S510 are the same, redundant description will be omitted.

Referring to FIG. 5A, in step S502, the remote operation unit 2203 of the terminal 200 transmits a startup request including various setting content (a set temperature, a set operation time, or the like) in response to a predetermined operation with respect to the GUI by the user to the center server 100 via the communication processing unit 2201.

In step S504, when the startup request from the terminal 200 is received by the communication processing unit 1201, the remote operation controller 1202 of the center server 100 transfers the startup request to the vehicle 2 via the communication processing unit 1201.

In step S506, when the startup request from the center server 100 is received by the DCM 90, the remote operation assistance controller 402 of the vehicle 2 sends an engine startup request and an air conditioning startup request to the engine controller 401 and the air conditioner ECU 20 to start up the engine 30 and the air conditioning device 10.

In step S508, the remote operation assistance controller 402 of the vehicle 2 transmits a startup notification indicating the startup of the engine 30 and the air conditioning device 10 to the center server 100 via the DCM 90.

In step S510, when the startup notification from the vehicle 2 is received by the communication processing unit 1201, the remote operation controller 1202 of the center server 100 transfers the startup notification to the terminal 200 via the communication processing unit 1201.

In step S512, the communication availability determination unit 403 of the vehicle 2 periodically transmits a response request signal to the center server 100 via the DCM 90 during the operation of the engine 30 after the startup of the engine 30 based on the startup request of the vehicle 2. Hereinafter, a step of transmitting a response request signal at each time, that is, an i-th (i is an integer equal to or greater than 1) response request signal is referred to as step S512-i.

In step S514, when the response request signal from the vehicle 2 is received by the communication processing unit 1201, the response signal transmission unit 1203 of the center server 100 replies the vehicle 2 with a response signal via the communication processing unit 1201. Hereinafter, a step of replying with the response signal corresponding to the step of transmitting the i-th response request signal will be referred to as step S514-i.

In step S516, the communication availability determination unit 403 of the vehicle 2 determines a communication availability state between the vehicle 2 and the center server 100 according to whether or not the response signal from the center server 100 is received by the DCM 90 within a predetermined time from the transmission of the response request signal. Hereinafter, the communication availability determination step corresponding to the step of transmitting the i-th response request signal is referred to as step S516-*i*.

In this example, the response signal is replied from the center server 100 to the vehicle 2 in response to all of the response request signals transmitted from the vehicle 2 to the center server 100 at each time of steps S512-1 to S512-N (N is an integer equal to or greater than 2) (steps S514-1 to S514-N). Thus, the communication availability determination unit 403 of the vehicle 2 determines that communication between the vehicle 2 and the center server 100 is available in all of steps S516-1 to S516-N.

In step S518, the remote operation unit 2203 of the terminal 200 transmits a stop request for stopping the engine 30 and the air conditioning device 10 that are started up based on the startup request and are being operated, to the center server 100 via the communication processing unit 2201 in response to a predetermined operation of the user with respect to the GUI of the display 240.

In step S520, when the stop request from the terminal 200 is received by the communication processing unit 1201, the remote operation controller 1202 of the center server 100 transfers the stop request to the vehicle 2 via the communication processing unit 1201.

In step S522, when the stop request from the center server 100 is received by the DCM 90, the remote operation assistance controller 402 of the vehicle 2 transmits an engine stop request and an air conditioning stop request to the engine controller 401 and the air conditioner ECU 20 to stop the engine 30 and the air conditioning device 10.

In step S524, the remote operation assistance controller 402 of the vehicle 2 transmits a stop notification indicating the stop of the engine 30 and the air conditioning device 10 to the center server 100 via the DCM 90.

In step S526, when the stop notification is received from the vehicle 2 via the communication processing unit 1201, the remote operation controller 1202 of the center server 100 transfers the stop notification to the terminal 200 via the communication processing unit 1201.

On the other hand, referring to FIG. 5B, in this example, the response signal is not replied from the center server 100 to the vehicle 2 with respect to the response request signal transmitted from the vehicle 2 to the center server 100 at each time of steps S512-M to S512-L (M and L are integers equal to or greater than 2 and satisfying a relationship of M<L). Thus, the communication availability determination unit 403 of the vehicle 2 determines that communication between the vehicle 2 and the center server 100 is disabled, that is, communication is disrupted at each time of steps S516-M to S516-L.

In step S524, since an elapsed time from communication disruption between the vehicle 2 and the center server 100 exceeds a predetermined threshold value, the direct communication permission unit 404 of the vehicle 2 determines that the communication between the vehicle 2 and the center server 100 has been disrupted. The predetermined threshold value is appropriately defined as a value that allows discrimination between a temporary communication unavailable state and communication disruption continued to a certain extent. The direct communication permission unit 404 permits direct communication between the vehicle 2 and the terminal 200, and outputs a connection request signal transmission command to the BT communication module 50.

In step S526, the BT communication module 50 (the connection request transmission unit 501) of the vehicle 2 transmits a connection request signal to the periphery of the vehicle 2 in response to a command from the direct communication permission unit 404.

In step S528, when there is the terminal 200 in a reaching range of the connection request signal output from the BT communication module 50, the BT communication module 230 (the connection establishment unit 2301) of the terminal 200 establishes communication with the terminal 200 and transmits a connection response to the BT communication module 50 of the vehicle 2 when the BT communication module 230 receives the connection request signal.

In step S530, when the connection response is received, the BT communication module 50 of the vehicle 2 receives the connection response and transmits a connection completion notification indicating that the connection process is completed to the BT communication module 230 of the terminal 200.

In step S532, the remote operation unit 2203 of the terminal 200 transmits a stop request for stopping the engine 30 and the air conditioning device 10 that are in operation based on the startup request to the vehicle 2 via the BT communication module 230 in response to a predetermined operation of the user with respect to the GUI of the display 240.

In step S534, the server notification unit 2204 of the terminal 200 transmits a stop-request direct transmission notification indicating that the stop request has been transmitted to the vehicle 2 through direct communication, to the center server 100 via the communication processing unit 2201. This is because the communication between the terminal 200 and the center server 100 is available. Accordingly, even when direct communication is performed between the vehicle 2 and the terminal 200, the center server 100 can recognize that the operation of stopping the engine 30 and the air conditioning device 10 has been performed in the terminal 200.

In step S536, when the stop request from the terminal 200 is received by the BT communication module 50, the remote operation assistance controller 402 of the vehicle 2 transmits an engine stop request and an air-conditioning stop request to the engine controller 401 and the air conditioner ECU 20 to stop the engine 30 and the air conditioning device 10.

In step S538, the remote operation assistance controller 402 of the vehicle 2 transmits a stop notification indicating that the engine 30 and the air conditioning device 10 have been stopped, to the terminal 200 via the BT communication module 50.

In step S540, when the server notification unit 2204 of the terminal 200 receives the stop notification from the vehicle 2 using the BT communication module 230, the server notification unit 2204 transfers the stop notification to the center server 100 via the communication processing unit 2201. Accordingly, even when the direct communication is performed between the vehicle 2 and the terminal 200 as described above, the center server 100 recognize that a process of stopping the engine 30 and the air conditioning device 10 is performed in the vehicle 2 in response to the stop request from the terminal 200 and the engine 30 and the air conditioning device 10 have been stopped.

Operation

As described above, in the first embodiment, when the communication between the center server 100 and the vehicle 2 is disrupted, the direct communication permission unit 404 of the vehicle 2 permits the direct communication in which transmission or reception of information on the startup of the engine 30 and the air conditioning device 10 based on the startup request are directly performed between the terminal 200 and the vehicle 2 without passing through the center server 100.

Accordingly, when the communication between the center server 100 and the vehicle 2 is disrupted, the direct communication between the terminal 200 and the vehicle 2 without passing through the center server 100 is permitted. Therefore, even when the communication disruption occurs and an operation of the vehicle 2 cannot be performed from the terminal 200 through the center server 100, the user can perform an operation regarding the startup of the engine 30 and the air conditioning device 10 of the vehicle 2 from the terminal 200 through the direct communication.

Further, in the first embodiment, a terminal communication device (for example, the BT communication module 230) and a vehicle communication device (for example, the BT communication module 50) capable of directly communicating between the terminal 200 and the vehicle 2 are provided in the terminal 200 and the vehicle 2, respectively. The direct communication permission unit 404 permits direct communication using the terminal communication device and the vehicle communication device between the terminal 200 and the vehicle 2.

Accordingly, it is possible to realize direct communication between the terminal 200 and the vehicle 2 using the communication devices for direct communication respectively provided in the terminal 200 and the vehicle 2, for example, communication devices based on a communication standard such as Bluetooth or Wi-Fi, as described above.

Further, in the first embodiment, the direct communication permission unit 404 of the vehicle 2 permits the direct communication when the communication between the center server 100 and the vehicle 2 is disrupted, and when the direct communication is permitted by the direct communication permission unit 404, the connection request transmission unit 501 of the vehicle 2 transmits a connection request signal for requesting establishment of communication between the vehicle 2 and the terminal 200 from the vehicle 2 to the terminal 200 using the vehicle communication device (the BT communication module 50).

Accordingly, in the vehicle 2, when the direct communication between the vehicle 2 and the terminal 200 is permitted, the connection request signal is transmitted to the terminal 200 using the communication device for direct communication (the BT communication module 50) provided in the vehicle 2, such that the direct connection between the vehicle 2 and the terminal 200 can be established.

Further, in the first embodiment, when the connection establishment unit 2301 of the terminal 200 receives the connection request signal, the connection establishment unit 2301 of the terminal 200 establishes communication between the terminal 200 and the vehicle 2 using the terminal communication device (the BT communication module 230) and the vehicle communication device (the BT communication module 50). When the communication is established between the terminal 200 and the vehicle 2 by the connection establishment unit 2301, the server notification unit 2204 transmits a notification regarding the information transmitted or received between the terminal 200 and the vehicle 2 to the center server 100.

As described above, when the direct communication between the terminal 200 and the vehicle 2 is established, information transmitted or received between the terminal 200 and the vehicle 2 is transmitted from a side receiving the connection request signal, that is, the terminal 200 in which communication with the center server 100 is likely to occur, to the center server 100. Thus, even when the communication between the center server 100 and the vehicle 2 is disrupted and exchange through the direct communication between the vehicle 2 and the terminal 200 is started, a situation of the direct communication can be recognized on the center server 100 side.

Further, in the first embodiment, the communication availability determination unit 403 of the vehicle 2 periodically transmits a response request signal to the center server 100, and determines whether or the communication between the vehicle 2 and the center server 100 is available based on the presence or absence of a reply from the terminal 200 in response to the response request signal.

As described above, specifically, it is possible to determine whether or not the communication between the center server 100 and the vehicle 2 is available by periodically transmitting the response request signal for requesting a reply from the vehicle 2 to the center server 100.

In the first embodiment, the direct communication permission unit 404 may determine whether or not the direct communication is permitted based on the determination result in the communication availability determination unit 403 as to whether or not the communication between the vehicle 2 and the center server 100 is available.

Accordingly, when the determination is made that the communication is unavailable based on the determination as to whether or not the communication is available through the periodic transmission of the response request signal, the determination is made that the communication is disrupted, and direct communication can be permitted.

In the first embodiment, when the direct communication permission unit 404 determines that the communication between the vehicle 2 and the center server 100 has been disrupted based on the determination result of the communication availability determination unit 403 and an elapsed time of disruption of the communication exceeds a predetermined threshold value, the direct communication may be permitted.

Accordingly, since the direct communication between the terminal 200 and the vehicle 2 is permitted after a certain time has elapsed from the communication disruption, a situation in which exceptional direct communication is permitted can be avoided, for example, in a case where the communication is temporarily disrupted and immediately restored.

In the first embodiment, the functions of the communication availability determination unit 403, the direct communication permission unit 404, and the connection request transmission unit 501 are provided in the vehicle 2, and the functions of the server notification unit 2204 and the connection establishment unit 2301 are provided in the terminal 200, but vice versa. That is, an aspect in which, in the terminal 200, when the communication between the center server 100 and the terminal 200 is disrupted, a connection request signal is transmitted from the BT communication module 230 of the terminal 200 and the connection request signal is received by the BT communication module 50 of the vehicle 2, so that the direct communication is realized may be adopted. Further, the function of the direct communication permission unit 404 may be provided in any one of the vehicle 2, the center server 100, and the terminal 200.

Second Embodiment

Next, a second embodiment will be described.

A remote startup system 1 according to the second embodiment is different from that according to the first embodiment in that the server notification unit 2204 of the terminal 200 is replaced with a tethering unit 2205. Hereinafter, the same or corresponding components as or to those in the first embodiment are denoted with the same reference numerals, and different parts will be mainly described.

Configuration of Remote Startup System

First, the remote startup system 1 according to the second embodiment will be described with reference to FIG. 6.

Figure 6:
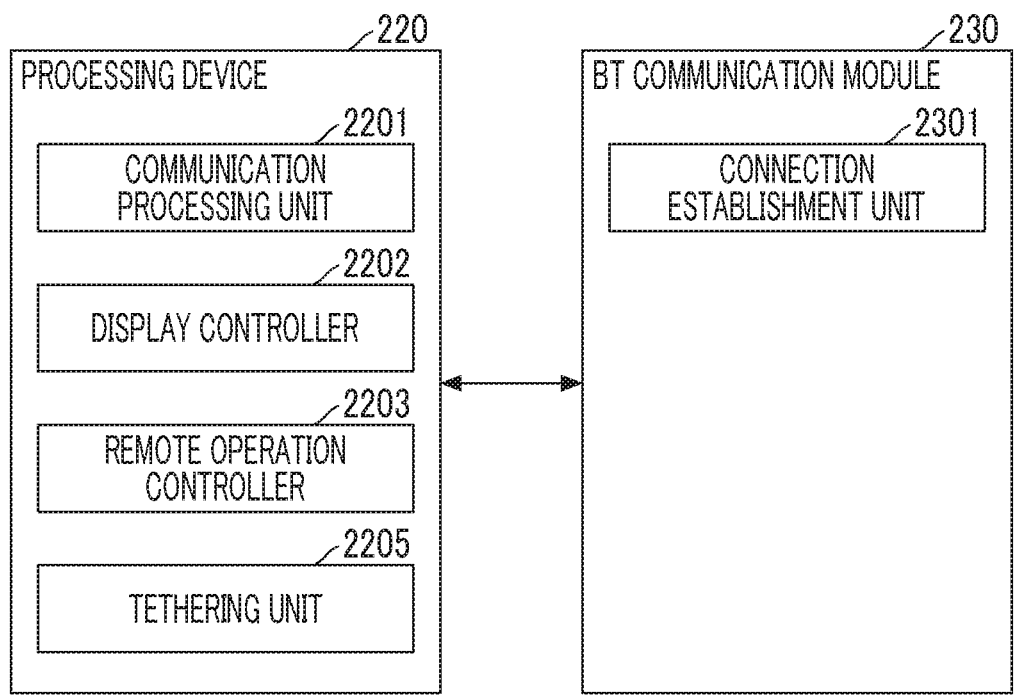
FIG. 6 is a configuration diagram illustrating an example of a configuration of a remote startup system according to a second embodiment.

FIG. 6 is a configuration diagram illustrating an example of a functional configuration of the terminal 200 according to the second embodiment.

An overall configuration of the remote startup system 1, a functional configuration of the vehicle 2, and a functional configuration of the center server 100 are illustrated in FIGS. 1 to 3, as in the first embodiment.

The vehicle 2 includes an air conditioning device 10, an air conditioner ECU 20, a room temperature sensor 21, an outside air temperature sensor 22, an engine 30, an engine ECU 40, a BT communication module 50, and a DCM 90, as in the first embodiment.

The engine ECU 40 includes, for example, an engine controller 401, a remote operation assistance controller 402, a communication availability determination unit 403, and a direct communication permission unit 404, as functional units that are realized by executing one or more programs stored in a ROM, an auxiliary storage device, or the like.

When the pairing state between the BT communication module 50 and the BT communication module 230 of the terminal 200 is established, the remote operation assistance controller 402 can use the tethering communication to connect to a communication network NW1, that is, the center server 100 using the terminal 200 (the communication device 210) as an access point as will be described below. Thus, in a case where the direct communication is permitted by the direct communication permission unit 404 even when the communication between the vehicle 2 and the center server 100 is disrupted, the remote operation assistance controller 402 can access the center server 100 via the terminal 200. That is, even after the direct communication is permitted by the direct communication permission unit 404, the remote operation assistance controller 402 transmits various signals to the terminal 200 through the center server 100 just through changing a communication path.

The terminal 200 includes a communication device 210, a processing device 220, a BT communication module 230, and a display 240, as in the first embodiment.

The processing device 220 includes, for example, a communication processing unit 2201, a display controller 2202, a remote operation unit 2203, and a tethering unit 2205 as functional units that are realized by executing one or more programs stored in a ROM, an auxiliary storage device, or the like on a CPU.

The tethering unit 2205 performs a tethering process of connecting the BT communication module 50 of the vehicle 2 of which the pairing process with the BT communication module 230 has been completed, the engine ECU 40 connected to the BT communication module 50, and the like to the communication network NW2, that is, the center server 100 using the terminal 200 (the communication device 210) as an access point.

The tethering unit 2205 can be realized by a general-purpose application program, a communication IC, or the like.

Detailed Operation of Remote Startup System

A specific operation of the remote startup system 1 according to the second embodiment will be described with reference to FIG. 7.

FIG. 7 is a sequence diagram schematically illustrating an example of the operation of the remote startup system 1 according to the second embodiment. Specifically, this is a specific example of the operation of the remote startup system 1 in a case where communication between the vehicle 2 and the center server 100 is disrupted.

Since a specific example of the operation of the remote startup system 1 in a case where a communication state between the vehicle 2 and the center server 100 is normal is the same as in FIG. 5A of the first embodiment, description thereof will be omitted.

Since steps S702 to S730 are the same as in FIG. 5B of the first embodiment, description thereof will be omitted.

In step S732, when the pairing process between the BT communication module 50 of the vehicle 2 and the BT communication module 230 of the terminal 200 is completed, the tethering unit 2205 of the terminal 200 starts tethering communication to communicably connect the vehicle 2 (for example, the BT communication module 50 and the engine ECU 40 connected to the BT communication module 50) to the communication network NW2.

In step S734, the remote operation unit 2203 of the terminal 200 transmits a stop request for stopping the engine 30 and the air conditioning device 10 that are in operation based on the startup request to the center server 100 via the communication processing unit 2201 in response to a predetermined operation of the user with respect to the GUI of the display 240. In this case, the remote operation unit 2203 may transmit various types of setting information for transferring the stop request to the vehicle 2 connected to the center server 100 through the tethering communication. Accordingly, in the next step S736, the center server 100 can transmit various signals such as the stop request to the vehicle 2 through the tethering communication via the terminal 200. Further, the various types of setting information may be transmitted from the terminal 200 to the center server 100 at the time of the start of the tethering communication in step S732.

In step S736, when the center server 100 receives the stop request from the terminal 200 using the communication processing unit 1201, the center server 100 transfers the stop request to the vehicle 2 via the terminal 200 via the communication processing unit 1201. In this case, the stop request transmitted from the center server 100 to the terminal 200 is transmitted from the BT communication module 230 to the vehicle 2 (the BT communication module 50) through the operation of the tethering unit 2205.

In step S738, when the stop request from the terminal 200 is received by the BT communication module 50, the remote operation assistance controller 402 of the vehicle 2 transmits an engine stop request and an air-conditioning stop request to the engine controller 401 and the air conditioner ECU 20 to stop the engine 30 and the air conditioning device 10.

In step S740, the remote operation assistance controller 402 of the vehicle 2 transmits a stop notification indicating that the engine 30 and the air conditioning device 10 have been stopped to the center server 100 via the BT communication module 50, the BT communication module 230 of the terminal 200, and the communication device 210 through the operation of the tethering unit 2205.

In step S742, when the stop notification from the vehicle 2 is received by the communication processing unit 1201 via the terminal 200, the remote operation controller 1202 of the center server 100 transfers the stop notification to the terminal 200 via the communication processing unit 1201.

Operation

As described above, in the second embodiment, when the connection request signal is received, the tethering unit 2205 of the terminal 200 communicably connects the vehicle 2 (for example, the BT communication module 50 and the engine ECU 40 connected to the BT communication module 50) to the center server 100 through tethering.

Accordingly, even when the communication between the center server 100 and the vehicle 2 is disrupted, the transmission or reception of information between the terminal 200 and the vehicle 2 can be performed through the center server 100 by using the tethering communication. Thus, even when the communication between the center server 100 and the vehicle 2 is disrupted and the exchange through the direct communication between the vehicle 2 and the terminal 200 is started, a situation of the direct communication can be recognized on the center server 100 side.

In the second embodiment, the functions of the communication availability determination unit 403, the direct communication permission unit 404, and the connection request transmission unit 501 are provided in the vehicle 2, and the functions of the tethering unit 2205 and the connection establishment unit 2301 are provided in the terminal 200, but vice versa. That is, an aspect in which, in the terminal 200, when the communication between the center server 100 and the terminal 200 is disrupted, the connection request signal is transmitted from the BT communication module 230 of the terminal 200, and the connection request signal is received by the BT communication module 50 of the vehicle 2, so that the direct communication is realized and the terminal 200 is connected to the center server 100 via the tethering communication using the vehicle 2 as an access point may be adopted. Further, the function of the direct communication permission unit 404 may be provided in any one of the vehicle 2, the center server 100, and the terminal 200.

Although the modes for carrying out the present disclosure has been described in detail above, the present disclosure is not limited to the specific embodiments as described above, and various modifications and changes can be made.

For example, although the engine 30 serving as the driving device that drives the air conditioning device 10 (the compressor) is a startup target in the embodiments described above, another driving device may be the startup target. For example, in a case where the vehicle 2 is an electric vehicle, an electric compressor, specifically, an electric motor (another example of the driving device) built into the electric compressor may be the startup target.

What is claimed is:

1. A remote startup system comprising:
a terminal;
a center server configured to communicate with the terminal and receive a startup request from the terminal; and
a vehicle on which a driving device is mounted, the vehicle being configured to
communicate with the center server,
receive the startup request from the center server, and start up the driving device,
wherein
the terminal includes a terminal wireless communication device configured to communicate with the vehicle, the vehicle includes a vehicle wireless communication device configured to communicate with the terminal,
the terminal includes one of a first processor and a second processor that are each configured to communicate with the center server,
the vehicle includes the other of the first processor and the second processor,
the first processor is configured to
permit direct communication using the terminal wireless communication device and the vehicle wireless communication device when communication between the first processor and the center server is disrupted, the direct communication being transmission or reception of information on the startup of the driving device based on the startup request, the direct communication being performed between the terminal and the vehicle directly without passing through the center server, and
when the direct communication is permitted, transmit a connection request signal for requesting establishment of communication between the terminal and the vehicle to the second processor, the connection request signal being transmitted by using the terminal wireless communication device or the vehicle wireless communication device, and
the second processor is configured to, when receiving the connection request signal from the first processor,
establish the communication between the terminal and the vehicle using the terminal wireless communication device and the vehicle wireless communication device, and
transmit a notification regarding information transmitted or received between the terminal and the vehicle to the center server when the communication between the terminal and the vehicle is established, the notification including information on at least one of the startup request or the startup of the driving device mounted on the vehicle.

2. The remote startup system according claim 1, wherein the second processor is configured to communicably connect one of the terminal and the vehicle that is a transmission source of the connection request signal to the center server through tethering when receiving the connection request signal.

3. The remote startup system according to claim 1, wherein
the first processor is configured to:
periodically transmit a response request signal to the center server; and
determine whether or not the communication between the first processor and the center server is available based on a presence or absence of a reply from the center server in response to the response request signal.

4. The remote startup system according to claim 3, wherein the first processor is configured to determine whether or not to permit the direct communication based on a result of the determination as to whether or not the communication between the first processor and the center server is available.

5. The remote startup system according to claim 4, wherein the first processor is configured to permit the direct communication when a determination is made, based on a determination result, that the communication between the first processor and the center server is disrupted and an elapsed time of communication disruption exceeds a predetermined threshold value.

6. A terminal configured to start up a driving device via a center server configured to communicate with a vehicle and transmit a transmission signal for starting up the driving device mounted on the vehicle to the vehicle, by communicating with the center server and transmitting a startup request to the center server, the terminal comprising:
- a terminal wireless communication device configured to communicate with the vehicle; and
- one or more processors configured to
  - permit direct communication using the terminal wireless communication device and a vehicle wireless communication device when communication between the one or more processors and the center server is disrupted, the direct communication being transmission or reception of information on the startup of the driving device based on the startup request, the direct communication being performed between the terminal and the vehicle directly without passing through the center server, and the vehicle wireless communication device being included in the vehicle and configured to communicate with the terminal,
  - when the direct communication is permitted, transmit a connection request signal for requesting establishment of communication between the terminal and the vehicle to the vehicle, the connection request signal being transmitted by using the terminal wireless communication device, and
  - when receiving the connection request signal from the vehicle,
    - establish the communication between the terminal and the vehicle using the terminal wireless communication device and the vehicle wireless communication device, and
    - transmit a notification regarding information transmitted or received between the terminal and the vehicle to the center server when the communication between the terminal and the vehicle is established, the notification including information on at least one of the startup request or the startup of the driving device mounted on the vehicle.

7. A vehicle configured to communicate with a center server communicating with a terminal and start up a driving device mounted on the vehicle in response to a predetermined transmission signal from the center server based on a startup request transmitted from the terminal to the center server, the vehicle comprising:
- a vehicle wireless communication device configured to communicate with the terminal; and
- one or more processors configured to
  - permit direct communication using a terminal wireless communication device and the vehicle communication device when communication between the one or more processors and the center server is disrupted, the direct communication being transmission or reception of information on the startup of the driving device based on the startup request, the direct communication being performed between the vehicle and the terminal directly without passing through the center server, and the terminal wireless communication device being included in the terminal and configured to communicate with the vehicle,
  - when the direct communication is permitted, transmit a connection request signal for requesting establishment of communication between the terminal and the vehicle to the terminal, the connection request signal being transmitted by using the vehicle wireless communication device, and
  - when receiving the connection request signal from the terminal,
    - establish the communication between the terminal and the vehicle using the terminal wireless communication device and the vehicle wireless communication device, and
    - transmit a notification regarding information transmitted or received between the terminal and the vehicle to the center server when the communication between the terminal and the vehicle is established, the notification including information on at least one of the startup request or the startup of the driving device mounted on the vehicle.

8. A remote startup method that is executed by a first processor and a second processor included in a terminal and a vehicle of a remote startup system, the remote startup system including the terminal, a center server communicating with the terminal, and the vehicle that is communicable with the center server, and the remote startup system being configured to start up a driving device mounted on the vehicle based on a startup request transmitted from the terminal to the center server, the terminal including one of a first processor and a second processor, the vehicle including the other of the first processor and the second processor, the first processor and the second processor being each configured to communicate with the center server, and the remote startup method comprising:
- permitting, by the first processor, direct communication using a terminal wireless communication device and a vehicle wireless communication device when communication between the first processor and the center server is disrupted, the direct communication being transmission or reception of information on the startup of the driving device based on the startup request, the direct communication being performed between the terminal and the vehicle directly without passing through the center server, the terminal wireless communication device being included in the terminal and configured to communicate with the vehicle, and the vehicle wireless communication device being included in the vehicle and configured to communicate with the terminal;
- when the direct communication is permitted, transmitting, by the first processor, a connection request signal for requesting establishment of communication between the terminal and the vehicle to the second processor, the connection request signal being transmitted by using the terminal wireless communication device or the vehicle wireless communication device; and
- when the second processor receives the connection request signal from the first processor,
  - establishing, by the second processor, the communication between the terminal and the vehicle using the terminal wireless communication device and the vehicle wireless communication device, and
  - transmitting, by the second processor, a notification regarding information transmitted or received between the terminal and the vehicle to the center server when the communication between the terminal and the vehicle is established, the notification including information on at least one of the startup request or the startup of the driving device mounted on the vehicle.

\* \* \* \* \*